(12) United States Patent
Colafrancesco et al.

(10) Patent No.: US 12,548,564 B2
(45) Date of Patent: Feb. 10, 2026

(54) SYSTEM AND METHOD FOR CONTROLLING A PLURALITY OF DEVICES

(71) Applicant: 7Hugs Labs, Montrouge (FR)

(72) Inventors: Julien Colafrancesco, Paris (FR); Simon Tchedikian, Paris (FR); Paul Coursaux, Paris (FR); François Gonard, Paris (FR)

(73) Assignee: Qorvo Paris, Paris (FR)

(*) Notice: Subject to any disclaimer, the term of this patent is extended or adjusted under 35 U.S.C. 154(b) by 221 days.

(21) Appl. No.: 17/790,795

(22) PCT Filed: Jan. 6, 2021

(86) PCT No.: PCT/IB2021/050070
§ 371 (c)(1),
(2) Date: Jul. 5, 2022

(87) PCT Pub. No.: WO2021/140447
PCT Pub. Date: Jul. 15, 2021

(65) Prior Publication Data
US 2023/0040394 A1    Feb. 9, 2023

Related U.S. Application Data

(60) Provisional application No. 62/957,520, filed on Jan. 6, 2020.

(51) Int. Cl.
*G10L 15/22* (2006.01)
*G06F 40/166* (2020.01)
(Continued)

(52) U.S. Cl.
CPC ............ *G10L 15/22* (2013.01); *G06F 40/166* (2020.01); *G10L 15/26* (2013.01); *G10L 15/30* (2013.01);
(Continued)

(58) Field of Classification Search
CPC ......... G10L 15/22; G10L 15/26; G10L 15/30; G10L 2015/223; G10L 2015/228; G06F 40/166
See application file for complete search history.

(56) References Cited

U.S. PATENT DOCUMENTS 9,443,527 B1    9/2016  Watanabe et al.
10,074,371 B1   9/2018  Wang et al.
(Continued)

FOREIGN PATENT DOCUMENTS

CN    105702252 A   6/2016
CN    106951491 A   7/2017
(Continued)

OTHER PUBLICATIONS

International Search Report and Written Opinion for International Patent Application No. PCT/IB2021/050070, mailed Mar. 15, 2021, 10 pages.
(Continued)

*Primary Examiner* — Pierre Louis Desir
*Assistant Examiner* — Kristen Michelle Masters
(74) *Attorney, Agent, or Firm* — Withrow & Terranova, P.L.L.C.

(57) ABSTRACT

Provided is a system and method for controlling a plurality of devices. The method includes generating a command script by processing a text string with at least one model, the text string including a natural language input by a user, modifying the command script based on contextual data, the command script including a configuration for at least one device, generating at least one command signal based on the command script, and controlling at least one device based on the at least one command signal.

35 Claims, 5 Drawing Sheets

(51) Int. Cl.
*G10L 15/26* (2006.01)
*G10L 15/30* (2013.01)

(52) U.S. Cl.
CPC .. *G10L 2015/223* (2013.01); *G10L 2015/228* (2013.01)

(56) References Cited

U.S. PATENT DOCUMENTS

| | | | |
|---|---|---|---|
| 10,354,011 B2 * | 7/2019 | Nell | G06F 3/167 |
| 10,872,604 B2 * | 12/2020 | Kim | G06F 3/0484 |
| 11,347,947 B2 * | 5/2022 | Zhicharevich | G06F 40/30 |
| 2013/0183944 A1 | 7/2013 | Mozer et al. | |
| 2017/0357637 A1 | 12/2017 | Nell et al. | |
| 2018/0052928 A1 | 2/2018 | Liu et al. | |
| 2019/0355351 A1 | 11/2019 | Kim et al. | |
| 2022/0027578 A1 * | 1/2022 | Chorakhalikar | G06N 5/022 |

FOREIGN PATENT DOCUMENTS

| | | |
|---|---|---|
| CN | 107667318 A | 2/2018 |
| CN | 109785833 A | 5/2019 |
| KR | 101465230 B1 | 11/2014 |

OTHER PUBLICATIONS

First Office Action for Chinese Patent Application No. 2021800008357.2, mailed Apr. 12, 2024, 30 pages.
Rejection Decision for Chinese Patent Application No. 202180008357.2, mailed Apr. 1, 2025, 22 pages.
Office Action for German Patent Application No. 112021000470.0, mailed Apr. 15, 2025, 12 pages.

\* cited by examiner

SYSTEM AND METHOD FOR CONTROLLING A PLURALITY OF DEVICES

CROSS REFERENCE TO RELATED APPLICATION

This application is a 35 USC 371 national phase filing of International Application No. PCT/IB2021/050070, filed Jan. 6, 2021, which claims priority to U.S. provisional application 62/957,520, filed Jan. 6, 2020, the disclosures of which are incorporated herein by reference in their entireties.

BACKGROUND

1. Field

This disclosure relates generally to controlling devices and, in non-limiting embodiments, to systems, methods, and computer-program products for controlling a plurality of devices using speech commands.

2. Technical Considerations

With the increasing popularity of "smart home" automation and appliances, users need a method for controlling a plurality of different devices using their spoken commands. Existing methodologies require predefined phrases that are recognizable by the system, thereby requiring users to remember specific device names, the full name of media content (e.g., a movie title or album name) they wish to play, the specific location name (e.g., within their home) of a device, and the like. This results in user frustration from erroneous commands being performed or from the user's commands being ignored and not recognized. Moreover, as the number of connected and wirelessly controlled devices increases, the number of possible ambiguities and resulting errors also increases.

SUMMARY

According to a non-limiting embodiment, provided is a method for controlling a plurality of devices with speech commands, comprising: generating, with at least one processor, a command script by processing a text string with at least one model, the text string comprising a natural language input by a user; modifying, with at least one processor, the command script based on contextual data, the command script comprising a configuration for at least one device; generating, with at least one processor, at least one command signal based on the command script; and controlling at least one device based on the at least one command signal.

According to another non-limiting embodiment, provided is a system for controlling a plurality of devices with speech commands, comprising at least one processor programmed or configured to: generate a command script by processing a text string with at least one model, the text string comprising a natural language input by a user; modify the command script based on contextual data, the command script comprising a configuration for at least one device; generate at least one command signal based on the command script; and control at least one device based on the at least one command signal.

According to another non-limiting embodiment, provided is a computer program product for controlling a plurality of devices with speech commands, comprising at least one non-transitory computer-readable medium including program instructions that, when executed by at least one processor, cause the at least one processor to: generate a command script by processing a text string with at least one model, the text string comprising a natural language input by a user; modify the command script based on contextual data, the command script comprising a configuration for at least one device; generate at least one command signal based on the command script; and control at least one device based on the at least one command signal.

Other non-limiting embodiments or aspects will be set forth in the following numbered clauses:

Clause 1: A method for controlling a plurality of devices with speech commands, comprising: generating, with at least one processor, a command script by processing a text string with at least one model, the text string comprising a natural language input by a user; modifying, with at least one processor, the command script based on contextual data, the command script comprising a configuration for at least one device; generating, with at least one processor, at least one command signal based on the command script; and controlling at least one device based on the at least one command signal.

Clause 2: The method of clause 1, wherein the configuration comprises at least one of the following: a setting, media content, or any combination thereof.

Clause 3: The method of clauses 1 or 2, wherein modifying the command script comprises: determining, with at least one processor, the configuration based on the contextual data; and replacing, with at least one processor, a portion of the command script with the configuration.

Clause 4: The method of any of clauses 1-3, wherein generating the command script comprises: generating, with at least one processor, a feature vector by processing the text string with at least one first machine-learning model; generating, with at least one processor, the command script by processing the feature vector with at least one second-machine learning model.

Clause 5: The method of any of clauses 1-4, wherein the first machine-learning model comprises an encoder of the at least one machine-learning model, and wherein the second machine-learning model comprises a decoder of the at least one machine-learning model.

Clause 6: The method of any of clauses 1-5, further comprising: receiving a speech input from the user; and translating, with at least one processor, the speech input to the text string.

Clause 7: The method of any of clauses 1-6, wherein the command script is generated or modified based on configuration data.

Clause 8: The method of any of clauses 1-7, further comprising replacing, with at least one processor, at least a portion of the command script based on configuration data.

Clause 9: The method of any of clauses 1-8, wherein the at least a portion of the command script comprises a location name, and wherein the at least a portion of the command script is replaced with a predefined location from the configuration data.

Clause 10: The method of any of clauses 1-9, wherein the configuration data comprises at least one data structure associating device identifiers with locations.

Clause 11: The method of any of clauses 1-10, further comprising normalizing, with at least one processor, the text string.

Clause 12: The method of any of clauses 1-11, further comprising: retrieving external data from a remote database based on at least a portion of the text string, wherein generating the command script is based further on the external data.

Clause 13: The method of any of clauses 1-12, wherein generating the command script comprises selecting the at least one device from a plurality of devices.

Clause 14: The method of any of clauses 1-13, wherein selecting the at least one device is based on at least one of the following: a location of the at least one device, a characteristic of the at least one device, a state of the at least one device, or any combination thereof.

Clause 15: The method of any of clauses 1-14, wherein selecting the at least one device is based on the characteristic of the at least one device, and wherein the characteristic comprises at least one of the following: a size, a shape, a color, a brand, a technical feature, or any combination thereof.

Clause 16: The method of any of clauses 1-15, wherein selecting the at least one device is based on the state of the at least one device, and wherein the state comprises at least one of the following: an activated state, a deactivated state, a value of a setting, or any combination thereof.

Clause 17: The method of any of clauses 1-16, wherein the command script comprises at least one action associated with at least one condition.

Clause 18: The method of any of clauses 1-17, wherein the contextual data comprises historical usage data of the at least one device.

Clause 19: The method of any of clauses 1-18, wherein the contextual data comprises at least one pattern of use.

Clause 20: The method of any of clauses 1-19, wherein the contextual data comprises at least one of a date and time.

Clause 21: The method of any of clauses 1-20, further comprising: determining, with at least one processor, an ambiguity in the text string and/or the command script; prompting, with at least one processor, a user for a second speech input based on the ambiguity; and modifying, with at least one processor, the text string and/or the command script based on the second speech input.

Clause 22: A system for controlling a plurality of devices with speech commands, comprising at least one processor programmed or configured to: generate a command script by processing a text string with at least one model, the text string comprising a natural language input by a user; modify the command script based on contextual data, the command script comprising a configuration for at least one device; generate at least one command signal based on the command script; and control at least one device based on the at least one command signal.

Clause 23: The system of clause 22, wherein the configuration comprises at least one of the following: a setting, media content, or any combination thereof.

Clause 24: The system of clauses 22 or 23, wherein modifying the command script comprises: determining the configuration based on the contextual data; and replacing a portion of the command script with the configuration.

Clause 25: The system of any of clauses 22-24, wherein generating the command script comprises: generating a feature vector by processing the text string with at least one first machine-learning model; generating the command script by processing the feature vector with at least one second-machine learning model.

Clause 26: The system of any of clauses 22-25, wherein the first machine-learning model comprises an encoder of the at least one machine-learning model, and wherein the second machine-learning model comprises a decoder of the at least one machine-learning model.

Clause 27: The system of any of clauses 22-26, wherein the at least one processor is further programmed or configured to: receive a speech input from the user; and translate the speech input to the text string;

Clause 28: The system of any of clauses 22-27, wherein the command script is generated or modified based on configuration data.

Clause 29: The system of any of clauses 22-28, wherein the at least one processor is further programmed or configured to replace at least a portion of the command script based on configuration data.

Clause 30: The system of any of clauses 22-29, wherein the at least a portion of the command script comprises a location name, and wherein the at least a portion of the command script is replaced with a predefined location from the configuration data.

Clause 31: The system of any of clauses 22-30, wherein the configuration data comprises at least one data structure associating device identifiers with locations.

Clause 32: The system of any of clauses 22-31, wherein the at least one processor is further programmed or configured to normalize the text string.

Clause 33: The system of any of clauses 22-32, wherein the at least one processor is further programmed or configured to retrieve external data from a remote database based on at least a portion of the text string, wherein generating the command script is based further on the external data.

Clause 34: The system of any of clauses 22-33, wherein generating the command script comprises selecting the at least one device from a plurality of devices.

Clause 35: The system of any of clauses 22-34, wherein selecting the at least one device is based on at least one of the following: a location of the at least one device, a characteristic of the at least one device, a state of the at least one device, or any combination thereof.

Clause 36: The system of any of clauses 22-35, wherein selecting the at least one device is based on the characteristic of the at least one device, and wherein the characteristic comprises at least one of the following: a size, a shape, a color, a brand, a technical feature, or any combination thereof.

Clause 37: The system of any of clauses 22-36, wherein selecting the at least one device is based on the state of the at least one device, and wherein the state comprises at least one of the following: an activated state, a deactivated state, a value of a setting, or any combination thereof.

Clause 38: The system of any of clauses 22-37, wherein the command script comprises at least one action associated with at least one condition.

Clause 39: The system of any of clauses 22-38, wherein the contextual data comprises historical usage data of the at least one device.

Clause 40: The system of any of clauses 22-39, wherein the contextual data comprises at least one pattern of use.

Clause 41: The system of any of clauses 22-40 wherein the contextual data comprises at least one of a date and time.

Clause 42: The system of any of clauses 22-41, wherein the at least one processor is further programmed or configured to: determining, with at least one processor, an ambiguity in the text string and/or the command script; prompting, with at least one processor, a user for a second speech input based on the ambiguity; and modifying, with at least one processor, the text string and/or the command script based on the second speech input.

Clause 43: A computer program product for controlling a plurality of devices with speech commands, comprising at least one non-transitory computer-readable medium including program instructions that, when executed by at least one processor, cause the at least one processor to: generate a command script by processing a text string with at least one model, the text string comprising a natural language input by a user; modify the command script based on contextual data, the command script comprising a configuration for at least one device; generate at least one command signal based on the command script; and control at least one device based on the at least one command signal.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DETAILED DESCRIPTION

Figure 1:
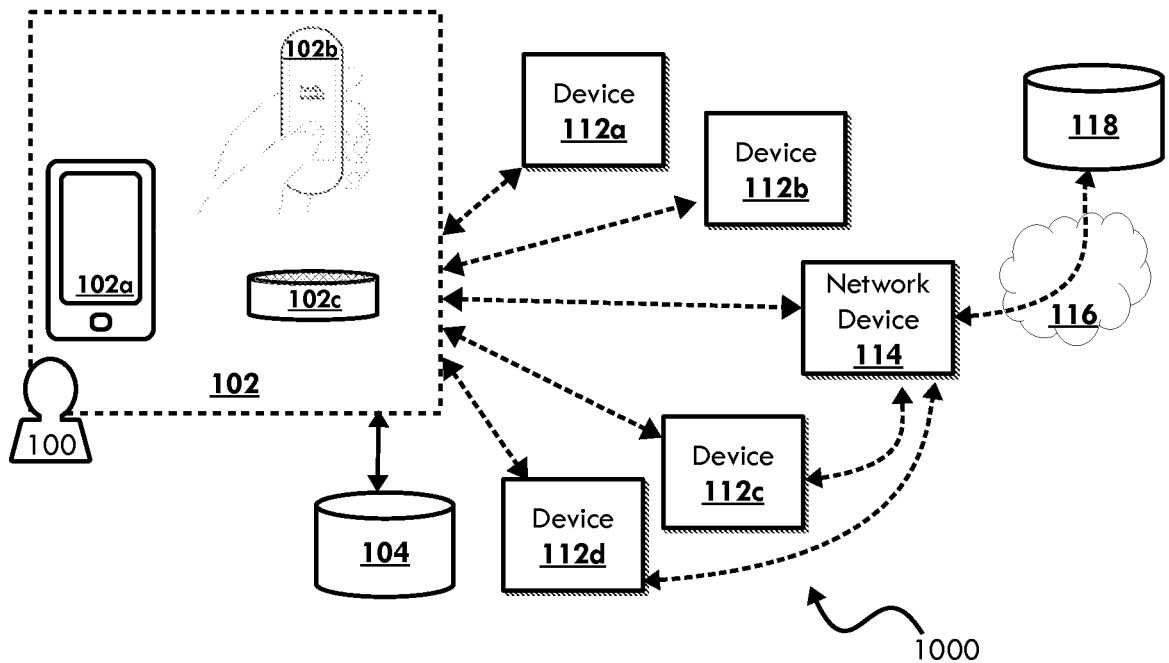
FIG. 1 illustrates a system for controlling a plurality of devices according to a non-limiting embodiment.

It is to be understood that the embodiments may assume various alternative variations and step sequences, except where expressly specified to the contrary. It is also to be understood that the specific devices and processes described in the following specification are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "server computer" and "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., server computers, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems. As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

In some non-limiting embodiments, the systems and methods described herein may allow a user to control one or more devices using spoken, natural language (e.g., conversational) commands in a manner that permits variations and alternative phrasings. As an example, a user may state "power on the lights," "turn the lights on," "put on some lights in the kitchen," and "turn on the ceiling lights" with the same or similar intent. In some non-limiting embodiments, a group of devices (e.g., a subset of a plurality of devices or the entire plurality) may be controlled based on a characteristic of the target device, such as "increase the luminosity of all the red lights" or "turn on the lights in the kitchen," even though such groups may not be predefined, thereby allowing use of the system without extensive configuration or manual set-up. Various other advantages are provided by the non-limiting embodiments described herein.

Referring now to FIG. 1, a system 1000 for controlling a plurality of devices 112a-112d is shown according to a non-limiting embodiment. The system includes one or more control devices 102, which may include any computing device such as a mobile device, a dedicated remote control device, a communication hub, a voice assistant device, and/or the like, operated by a user 100 or in communication with a computing device operated by a user. FIG. 1 shows a mobile device 102a, remote control device 102b, and voice assistant device 102c as examples, although it will be appreciated that one or more of any type of computing device may be used as the control device 102. Moreover, a user 100 may switch between using one or more of the control devices 102 and may use a combination of control devices 102. The user 100 operates the control device 102 to control one or more devices 112a-112d, which may include, for example, one or more appliances or other electronic devices such as lighting devices (e.g., fixtures, light bulbs, etc.), electrical outlets, stereo systems, speakers, televisions, window blinds, thermostats, kitchen appliances, and/or the like. The control device 102 may include a microphone, one or more other input devices (e.g., a touchscreen, buttons, and/or the like), and one or more display devices. In some non-limiting embodiments, the control device 102 may be a smart phone. The control device 102 may be in communication with each of the devices 112a-112d in various ways. For example, the control device 102 may communicate with one or more of the devices 112a-112d via direct radio communication (e.g., Bluetooth® or the like), infrared communication, sonic communication (e.g., audible signals), and/or the like. In some examples, the control device 102 may be in communication with a network device 114, such as a network router, that is in communication with one or more devices 112c, 112d. In such arrangements, the control device 102 may communicate with the devices 112c, 112d indirectly via the network device 114.

With continued reference to FIG. 1, the user 100 may speak a verbal command that is received by the control device 102. For example, a microphone on the control device 102 or a microphone in communication with the control device 102 may receive the user's verbal command. The control device 102 or another computing device in communication with the control device 102 then processes the user's spoken command into text. The user's verbal command may be processed with a speech-to-text engine that resides on the control device 102 or is provided as a remote service to the control device 102. Once the user's 100 verbal command is converted to a text string, it is used to generate a command script configured to control a device 112a-112d.

Still referring to FIG. 1, the control device 102 may be in communication with one or more databases 104 stored in one or more data storage devices on a control device 102 or is otherwise in communication with a control device 102. The database 104 may include a configuration database including information relating to the devices 112a-112d such as, but not limited to, make and/or model information for the devices 112a-112d, default settings for the devices 112a-112d, locations of the devices 112a-112d (e.g., kitchen, bedroom, living room, and/or the like), characteristics of the devices 112a-112d (e.g., size, shape, color, weight, and/or the like), types of actions performable by the devices 112a-112d (e.g., device capabilities), aliases for the devices, and/or other information relating to the devices 112a-112d. The use of aliases for the devices 112a-112d allows for the identification of a device without having to articulate the make and/or model. For example, aliases may be listed in a database 104 to include alternative terms for the devices. A device that is characterized as a television (e.g., as a device type) may be associated with aliases such as "TV," "television," "flat screen," and/or the like. A device that is characterized as a media streaming device may be associated with aliases such as "Roku," "Streaming Stick," "Roku Express," "Fire TV," "Amazon Fire," "Chromecast," "Playstation," and/or the like. As another example, a device that is characterized as a speaker may be associated with aliases such as "soundbar," "stereo," "sound system," "Sonos," "Sonos speaker, "Bose," and/or the like. As a further example, a device that is characterized as a set-top box may be associated with aliases such as "TV box," "G-Box," "Xfinity," and/or the like. Aliases may include synonyms, alternative terminology, colloquial references, brand names, and/or the like. In some non-limiting embodiments, a database 104 may include a list of devices by make and model, where each device is associated with a device type (e.g., TV, media streaming device, set-top box, speaker, light, etc.) in addition to one or more aliases. Aliases may also be learned through repeated uses of the system such that the database 104 is updated as new aliases are identified.

In non-limiting embodiments, the database 104 may also include contextual data relating to present and past usage of the control device 102 and/or devices 112a-112d. The present usage of the devices 112a-112d may include the current state(s) of the device(s). The past usage of the control device 102 or devices 112a-112d may include a history of commands and/or past state(s) of the devices. For example, the contextual data may include past actions performed with the control device 102, locations from which the control device 102 was previously used for performing actions, times and/or dates from when the control device 102 was used for performing actions, sequences and/or patterns of actions, current and past device states, and/or other like information relating to the use of the control device 102 and/or the devices 112a-112d. The data stored on the database 104 may be distributed throughout one or more different data structures, databases, and/or data storage devices. For example, a separate device database may store information about each device such as make and/or model information for the devices 112a-112d, default settings for the devices 112a-112d, locations of the devices 112a-112d, characteristics of the devices 112a-112d, types of actions performable by the device (e.g., device capabilities), and/or the like. A separate database may store content information and, in some non-limiting examples, there may be a separate database for each type of content (e.g., music, movies, audio books, etc.), each listing information such as title, artist name, and/or the like.

The parameters stored in the databases 104 may be used to filter a selection of a device or a configuration based on one or more known parameter values. For example, the state of the devices may be used to identify a target device or at least reduce the number of possible target devices. In this manner, the list of all possible devices may be filtered to only include devices that are capable of receiving such a command. If a first light is already powered on, for example, a command to "turn on the lights" will not be targeted to the first light because it is already on. Similarly, if a first light is powered off, a command to "increase brightness to 100%" or "change light color to red" will not be targeted to the first light because the terms "increase" and "change" imply that the target light is already on. Thus, the system can identify all lights that are currently on to determine if the target light can be identified. Likewise, device capabilities may also be used to filter devices because if a command is to "increase brightness to 100%" and one or more lighting devices are not dimmable, then those lighting devices may be eliminated from consideration as the target device. In non-limiting embodiments, identifying a target device may involve filtering the plurality of devices 112a-112d by capability and present state to reduce the number of possible target devices to only those capable of executing the command.

With continued reference to FIG. 1, the control device 102 may also be in communication with one or more external databases 118 accessible over a network environment 116, such as the Internet, via a server computer or other computing device. The control device 102 may communicate with the network environment 116 directly and/or via the network device 114. The control device 102 may communicate with the external databases 118 using one or more APIs, for example. In non-limiting examples, an external database 118 may include one or more content libraries including names and/or other information relating to movies, television shows, television channels, playlists, musical genres, music, books, and/or other forms of media content. In non-limiting embodiments, one or more external databases 118 may also be used to store configuration data and/or contextual data as described above with respect to database 104. In non-limiting embodiments, one or more external databases 118 may also store information about different devices that can be queried for resolving ambiguities, such as a device database including make and/or model information for the devices 112a-112d, default settings for the devices 112a-112d, locations of the devices 112a-112d, characteristics of the devices 112a-112d, types of actions performable by the devices 112a-112d (e.g., device capabilities), and/or other information relating to devices based on the make and/or model. In some non-limiting embodiments, one or more databases 104 local to the control device 102 may be updated based on one or more external databases 118. Such updating may be performed on a periodic basis, as new data becomes available, as requested by the user, and/or the like.

Figure 2:
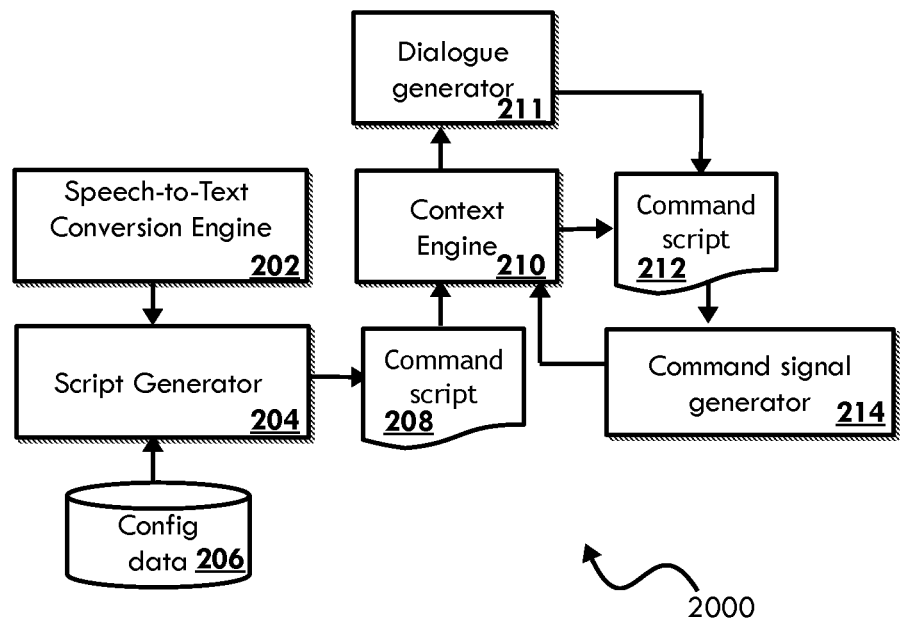
FIG. 2 illustrates a system for controlling a plurality of devices according to another non-limiting embodiment.

Referring now to FIG. 2, components of a system 2000 for controlling a plurality of devices are shown according to a non-limiting embodiment. A user's speech command is input to a speech-to-text conversion engine 202, which may include software and/or hardware configured to convert audio data of naturally spoken language to a text string. The speech-to-text conversion engine 202 may include, for example, a software function executed by a control device or a remote server computer. The speech-to-text conversion engine 202 outputs a text string of the user's speech command which is input to a script generator 204, which may include software and/or hardware configured to generate one or more command scripts based on the text string. The script generator 204 may include, for example, a software function executed by a control device or a remote server computer. In non-limiting embodiments, the script generator 204 includes one or more models, such as one or more machine learning models, configured to process the text string and generate a command script 208. In non-limiting embodiments, the script generator 204 is in communication with a database 206 including configuration data that may be used to generate a command script 208. The script generator 204 outputs a raw command script 208 (e.g., an initial command script).

With continued reference to FIG. 2, the command script 208 output by the script generator 204 may include one or more ambiguities (e.g., an unknown or uncertain parameter value). For example, the command script 208 may include a placeholder for a target device to be controlled that could be one or more different devices. As another example, the command script 208 may specify an ambiguous configuration for an unidentified target device, such as a particular setting, media content to be played, and/or the like. The command script 208 is input to the context engine 210, which may include software and/or hardware configured to generate one or more refined command scripts 212 based on the raw command script 208 and contextual data. The context engine 210 may include, for example, a software function executed by a control device or a remote server computer. The context engine 210 outputs a refined command script 212 that is input to a command signal generator 214.

Still referring to FIG. 2, in some non-limiting embodiments, before or after being processed with the context engine 210, the command script with ambiguities may be input into a dialogue generator 211, which may include software and/or hardware configured to generate one or more prompts for a user to resolve one or more ambiguities. The dialogue generator 211 may include, for example, a software function executed by a control device or a remote server. The command signal generator 214 may include software and/or hardware configured to generate one or more command signals based on the raw command script 208 and/or refined command script 212. The command signal generator 214 may include, for example, a software function executed by a control device or a remote server computer. It will be appreciated that, in some non-limiting embodiments, the command script 208 may be input directly to the command signal generator 214 if there are no ambiguities to be resolved using the context engine 210 and/or dialogue generator 211. In non-limiting embodiments, the command signal generator 214 may receive feedback from the target devices (such as an acknowledgement) and pass the information to the context engine 210 to be stored as contextual data.

Figure 3:
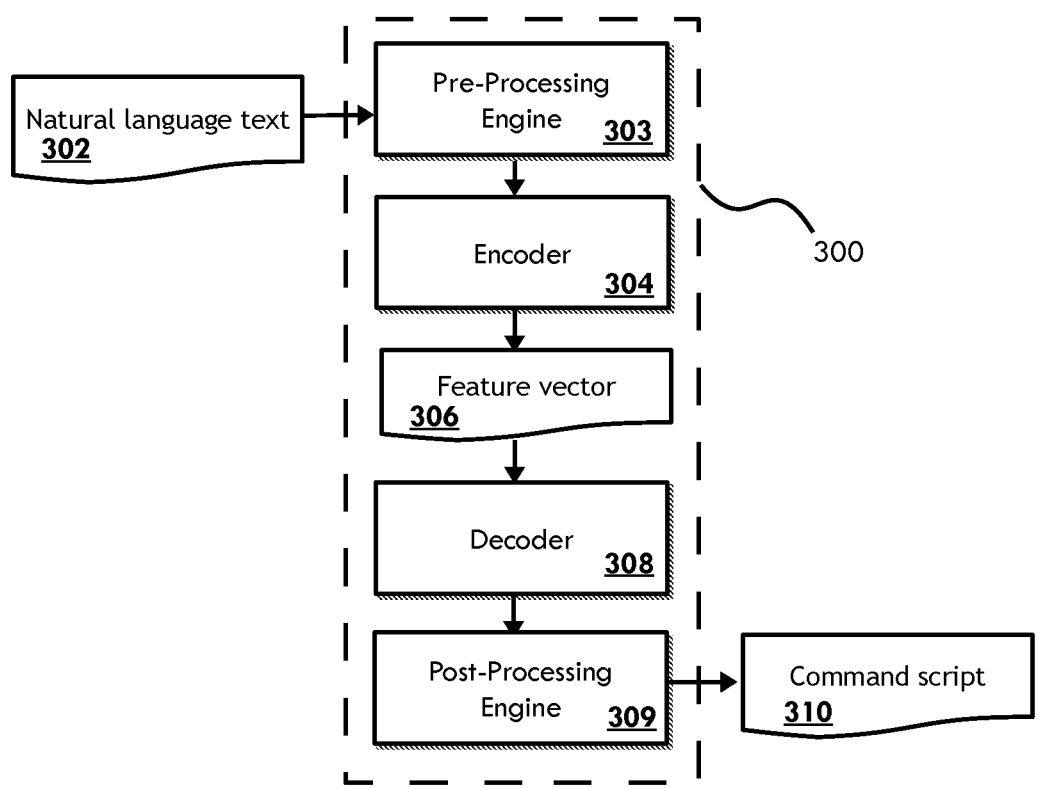
FIG. 3 illustrates a model architecture for use with a system for controlling a plurality of devices according to a non-limiting embodiment.

FIG. 3 shows a script generator 300 according to a non-limiting embodiment. The script generator 300 may include one or more models, rules, and/or algorithms. In the depicted example, the script generator 300 includes a model architecture having an encoder model 304 configured to receive, as input, a text string 302 of a natural language input and, based on that input, output a feature vector 306. The encoder model 304 may include, for example, a neural network and/or any other type of model architecture. The script generator 300 may also include a decoder model 308 configured to receive, as input, the feature vector 306 output by the encoder model 304 and, based on that input, output a command script 310. The decoder model 308 may include, for example, a neural network and/or any other type of model architecture. The script generator 300 may also include a pre-processing engine 303 and a post-processing engine 309 to respectively perform pre-processing on the initial text string and to perform post-processing on the command script. The pre-processing engine 303 and post-processing engine 309 may include software and/or hardware such as, for example, a software function executed by a control device or a remote server. It will be appreciated that various model architectures and any number of models may be used by the script generator 300.

In non-limiting embodiments, one or more models used by the script generator 300 may be trained using a synthetic training dataset generated with a set of phrases having alternate formulations and synonyms. The synthetic training dataset may be modified by adding, replacing, and/or removing words or phrases to increase the robustness of the algorithm.

In non-limiting embodiments, the command script is in an intermediary scripting language that is applicable to each of a plurality of difference devices, even though each device may use one or more specific communication protocols for directly receiving commands. For example, a command script may specify the command to be performed (e.g., power on, power off, play, stop, etc.), one or more configurations (e.g., 50% light intensity, blue light color, maximum volume, classical music, a specific movie, etc.), and one or more target devices to be controlled (e.g., a device identifier or group of device identifiers). Configuration parameters may include any type of device setting or content that may be played, displayed, and/or presented by a device. In non-limiting embodiments, a command script may be color coded such that different parameters of a command are colored differently. For example, a command may be in a first color, a configuration parameter may be in a second color, and a target device may be in a third color. It will be appreciated that various arrangements and formats for the command script are possible.

Figure 4:
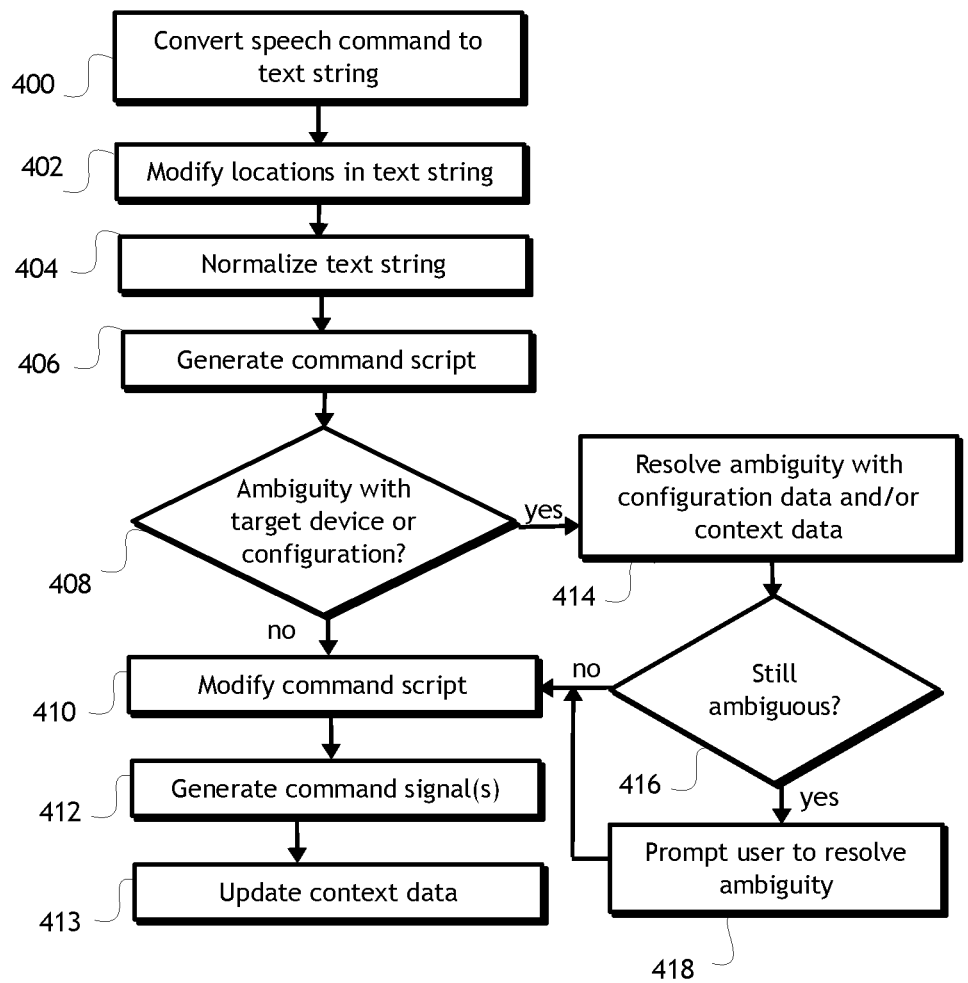
FIG. 4 illustrates a flow diagram for a method for controlling a plurality of devices according to a non-limiting embodiment.

Referring now to FIG. 4, a method for controlling a plurality of devices is shown according to a non-limiting embodiment. It will be appreciated that the steps shown in FIG. 4 are for example only and that, in some non-limiting embodiments, additional, fewer, different, and/or a different order of steps may be used. At a first step 400, a speech input of a natural language command is converted to a text string. The text string that is generated represents the natural language of the user's verbal command.

At step 402, a search and replace operation may be performed on the text string to normalize the locations based on available data such as, for example, user-defined rooms in a configuration database. The locations may be replaced with predefined location identifiers. For example, a configuration database may include location identifiers associated with each device of a plurality of devices. The location identifiers may be room names (e.g., "kitchen," "master bedroom," etc.) or unique values. In some non-limiting embodiments, the longest substrings may be matched first. For example, when a device name or location name is identified in the text string, the longest name may be matched first in priority. Accordingly, if a configuration database includes the string "Tim's room" as a room identifier and "Tim's room TV" as a device identifier, the algorithm will first try to match the longest name first ("Tim's room TV") and, if the longest name is not found, will then try to match the shorter name ("Tim's room"). In non-limiting embodiments, if a location (e.g., room) does not exist in the configuration database, it may be replaced with a semantically closest location identifier that exists in the configuration database.

Figure 5:
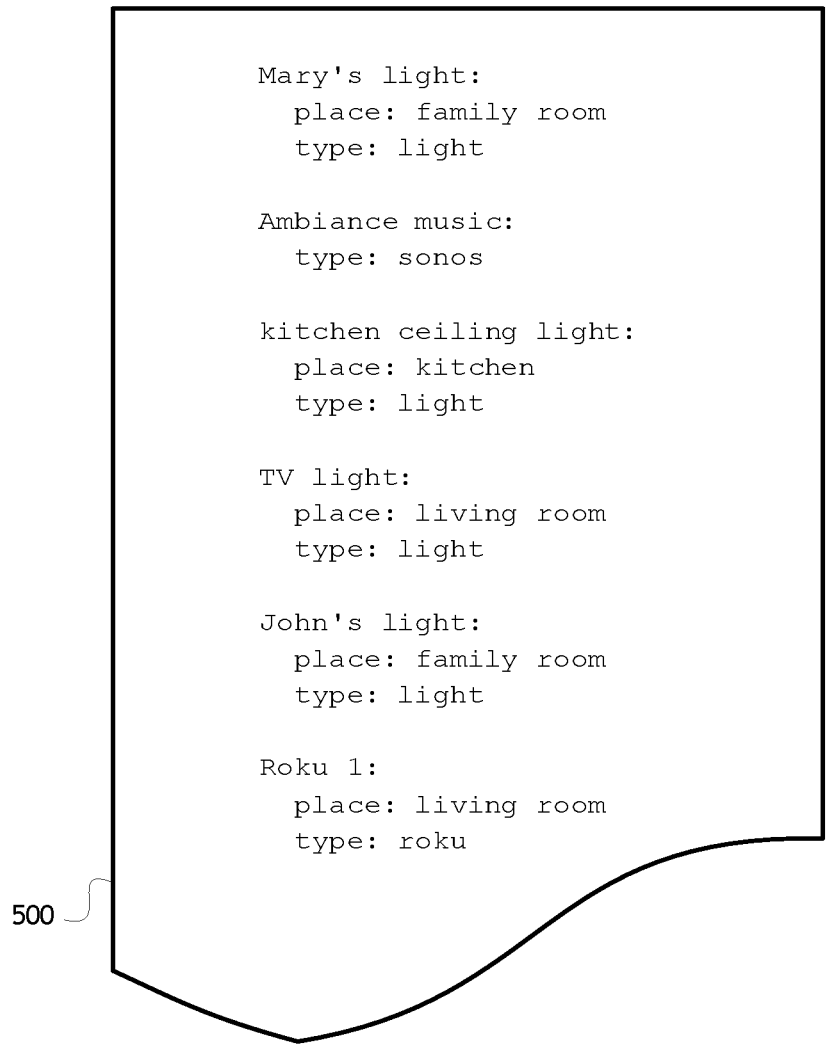
FIG. 5 illustrates a configuration database according to a non-limiting embodiment.

Example configuration data 500 from a configuration database is shown in FIG. 5. The configuration data 500 includes device names (e.g., text that can be matched with text from a spoken command), location names ("place"), and device types ("type"). The location names may be user-defined or may be standardized. In non-limiting embodiments, the configuration database may be generated during an initial set-up process with user input. A topology may be created for a user's home or office, as an example. Non-limiting embodiments of the systems and methods described herein may be implemented without using a configuration database. For example, a longer scripting language may be implemented that includes a broader variety of locations (e.g., rooms) and devices. Moreover, other types of encoding may be used in place of a configuration database. In some non-limiting embodiments, the location information in the configuration database is used to identify devices based on their location (e.g., an actual location name) rather than the device identifier (e.g., "light number 23"). In some non-limiting embodiments, the configuration database may include two files, where a first file contains the device locations and a second file contains the location names and associated locations. Both files may be used to recognize a device or group of devices based on a location name.

At step 404, additional pre-processing may be performed on the text string to normalize the spoken command in one or more ways. Normalizing the text string removes irregularities or variable aspects of a natural language text string that may change among users and/or even the same user. For example, the characters in the string may be converted to lowercase characters, punctuation and/or special characters may be removed, byte pair encoding may be performed (e.g., replacing a substring with data that can be identified in a look-up table), and/or the like. Byte pair encoding advantageously allows individual words in a term with multiple words to be separately recognized and considered by splitting an unknown term into two or more known words. As an example, the natural language text string "I want to hear my bounce and chill playlist on my roku" may be initially translated to "select_playlist bounce and chill type roku" and, with byte pair encoding, may be modified to "select_playlist 6 5 type roku" where "6 5" is a byte pair encoding that represents "bounce and chill". In some non-limiting embodiments, a token may be used to replace a substring rather than using byte pair encoding.

At step 406, a command script is generated based on the text string. This step 406 may include translating the text string output by step 404 according to one or more models, algorithms, rules, and/or the like. In a non-limiting embodiment, one or more neural networks may be used to generate the command script. In some non-limiting embodiments, the command script generated at step 406 may be a raw command script that includes a machine-interpretable sequence of tokens or alphanumeric characters.

In non-limiting embodiments, the raw command script may not be directly executable by a control device. For example, if the natural language text string specifies "I want to play the Lion King," the raw command script may not include any reference to pre-existing context (e.g., such as a content database including movie titles). As an example, the text string "I want to play the Lion King" may be initially converted to a portion of a raw script of "select_content lion king" by normalizing the text (e.g., at step 404) and inserting a command (e.g., "select_content"). In this example, the "Lion King" input is identified as content (e.g., based on the term "play"), but the type of content (e.g., movie, music, audio book, etc.) and the target device (e.g., a particular television, monitor, speaker, etc.) are both unknown.

At step 408, it is determined if there are any ambiguities in the command script. If there are ambiguities to be resolved, the method may proceed to step 414. It will be appreciated that, in some non-limiting embodiments, the method may proceed from step 408 to step 414 even if there are no ambiguities detected, such that configuration data and/or contextual data may be considered to verify the accuracy of the command script or to detect anomalies.

At step 414, ambiguities in the command script are attempted to be resolved based on the configuration data and/or contextual data. Step 414 may be a post-processing step performed after the command script is initially generated, as shown in FIG. 4, or in other examples may be implemented as part of a model (e.g., as a decoder model) used to generate the command script. In some non-limiting embodiments, a command script may be generated at step 406 that includes a placeholder (e.g., a token) for an unknown value. Such a token may be inserted into the command script during its initial generation if a device, location, command, and/or other parameter cannot be identified in the natural language text string. For example, if the text string is "turn light on" and there are multiple lighting devices in the configuration database or otherwise recognized by the control device, a script may be generated with the token "{unknown}" in place of a device identifier (e.g., "power on type light {unknown}"). At step 414, the configuration data may be analyzed again to determine if additional information is available for resolving the ambiguity and for replacing the token with a device or a group of devices. For example, if the lights identified in the configuration data are in one location, it may be inferred that all lights should be turned on and the token may be replaced with device identifiers for each of the lighting devices associated with that location in the configuration database.

At step 414, ambiguities in the command script may be resolved in various ways. For example, the name "game of thrones" may be identified as media content based on the command (e.g., "play game of thrones"). In particular, the type of content may be a movie title, a playlist, an album name, a channel name, and/or the like, based on being content that can be "played". If the user states "watch game of thrones," the term "watch" may identify the content type to be a movie. This may also be used to resolve ambiguities in the device name by identifying only those devices that are capable of being watched and/or of playing or watching a movie. The configuration database may include, for example, available commands associated with each device such that the target device capabilities may be checked against the requested command. An ambiguity may arise if, for example, a target device is not compatible with the requested command. Ambiguities may also be resolved by communicating with one or more content databases. For example, a fuzzy search for "game of thrones" in a content database may retrieve the precise title (e.g., "The Game of Thrones") that can be used to replace a token. In some non-limiting embodiments, additional words in the text string may be used to resolve the ambiguities, such as a name of an actor or a content provider (e.g., "Netflix®," "Amazon Prime™," "HBO®," "Spotify®," etc.).

In non-limiting embodiments, ambiguities with identifying one or more devices may be resolved by first identifying the devices that could possibly be intended (e.g., relating to lighting devices). Then, only those devices that are compatible with the command (e.g., capable of performing the command) may be retained. Among those compatible devices, the last device or devices used to perform the command or in similar contexts may be identified. In some examples, the current state of the possible target devices may be considered to further resolve any ambiguities. For example, if a device has a current state that matches a target configuration for the device (e.g., a light is already powered on), then it can be determined that the target device is a different light.

In non-limiting embodiments, ambiguities with identifying one or more devices may be resolved based on a location of the at least one device and/or a location of the control device. For example, if a natural language text string states "play game of thrones in Tim's room", the configuration data may specify that "Tim's room" corresponds to a particular room (e.g., "bedroom 2") that includes a particular device (e.g., "television 3"), and therefore that particular device may be used in the command script and/or used to replace a token in the command script. The present location of the user and/or the control device being operated by the user may also be used to identify a device by, for example, identifying all devices within proximity to the user or in the same room as the user and determining, from those devices, if more than one device can perform the command. If only one device can perform the command (e.g., only one television) in a particular location, that device may be inserted into the command script.

In non-limiting embodiments, ambiguities with identifying one or more devices may be resolved based on a characteristic of the at least one device. For example, if a natural language text string states "play my playlist on the large speaker" or "play my playlist on the blue speaker," the configuration database (or a separate device characteristic database) may specify that a "large" or "blue" speaker corresponds to characteristics of a particular speaker (e.g., "speaker 1"), and therefore that particular device may be used in the command script and/or used to replace a token in the command script. The device characteristics may include, for example, size, color, shape, and/or the like. Such characteristics may also be relative to other devices of the plurality of devices. In some non-limiting embodiments, if such characteristics are not provided in a configuration database, one or more external databases may be queried to obtain characteristics about the plurality of devices to find a match.

In non-limiting embodiments, ambiguities with identifying one or more devices may be resolved based on a state of the at least one device. For example, if a natural language text string states "turn off the light" or "increase brightness of light," the current state (e.g., on, off, a particular intensity, etc.) of the plurality of lighting devices may be used to resolve the ambiguity. If, for example, only one lighting device is associated with an "on" state, then it can be determined that the lighting device that is "on" is the only lighting device that can be turned "off" or increased in intensity. The device state may include, for example, a power status (e.g., on or off), an intensity (e.g., percent brightness or volume), an emitted color (e.g., a red light), and/or the like.

In non-limiting embodiments, ambiguities with one or more devices and one or more configurations for such devices may be resolved by using contextual data. Contextual data may include past actions performed with the control device, locations from which the control was used for performing actions, times and/or dates from when the control device was used for performing actions, sequences and/or patterns of actions, and/or other like information relating to the use of the control device and/or the devices to be controlled. In some examples, the contextual data may also relate to the state(s) of the devices. As an example, if a light was previously turned on in the past five (5) minutes, a natural language text string of "turn the light off" may be interpreted in view of the context. Even though the lighting device is ambiguous if there are multiple lighting devices, especially if there are multiple lighting devices that are currently "on," the recent context of the command (the lighting device that was recently turned on) is relied on to identify that lighting device.

In some non-limiting embodiments, the contextual data may specify user habits or patterns of use. For example, if a user has two televisions and habitually watches a first television on weeknights after 9:00 PM (e.g., a bedroom television), a natural language text string of "turn on television" on a Monday at 9:30 PM may be resolved by identifying the first television in the command script rather than a second television owned by the user that is not typically used at that time. In another example, if a user habitually plays the song "The Lion Sleeps Tonight" from the Lion King soundtrack on mornings on or after 8:00 AM, then the ambiguous content "Lion King" in the command script may be replaced with "The Lion Sleeps Tonight" and the typical device used (e.g., bedroom speaker) is identified as the target device. Thus, the raw script "select_content 'lion king'" is modified into a refined script of "select_song 'the lion sleeps tonight' type sonos". This refined script identifies the content (the song "The Lion Sleeps Tonight") and the target device (a Sonos speaker system), even though both parameters were ambiguous in the natural language. In some examples, the ambiguity over the content (e.g., whether "lion king" refers to music or a movie) may be resolved using a content database. A popularity rating (e.g., number of views/listens, number of comments, number of tweets, and/or the like) associated with each content may be used to select the most likely content.

At step 416 of FIG. 4, it is determined if the ambiguities in the command script have been resolved. If the ambiguities have not been resolved, the method may proceed to step 418 in which the user is prompted to resolve the ambiguity. For example, a user may be audibly prompted through a mobile device, control device, speaker system, etc. and/or may be visually prompted through one or more GUIs on the control device, a mobile device, television, and/or other device. The prompt may ask the user to particularly identify the target device or configuration. In some examples, the user may be presented with a GUI listing options to choose from. For example, if the natural language text string is "I want to play the lion king" and the system resolves a first ambiguity as to the content (e.g., the song "The Lion Sleeps Tonight") but not a second ambiguity (the target device), a prompt may ask the user "where would you like to play the lion king?". If the user's response resolves the ambiguity (e.g., "the kitchen" and there is only a single speaker in the kitchen), the method may then proceed to step 410. Additional prompts may be generated and presented until the ambiguity is resolved.

At step 410, the command script is modified. This may include, as described above, generating a refined command script from a raw command script. In non-limiting embodiments, step 410 may be performed concurrently with steps 406 and 414 such that modifications may be made while generating the raw command script (e.g., during a decoding process) and/or as a post-processing step after the raw command script is already generated. In some non-limiting embodiments, one or more machine learning algorithms may be used to generate the refined command script at step 410. A machine learning algorithm may be trained based on contextual data from the context database. For example, based on a machine learning model trained using commands that are deemed unambiguous, ambiguous command scripts may be modified. As an example, an unambiguous command script of "select_channel 5 type tv and type samsung and place living room" may be a previously-used command script for switching the channel on a particular device (a Samsung television in the living room). Then, subsequent command scripts such as "select_channel 5 type tv and place living room" (potentially ambiguous if there are multiple televisions in the living room), "select_channel 5 type tv and type samsung" (potentially ambiguous if there are multiple Samsung televisions in the home), or "select_channel 5 type samsung and place living room" (potentially ambiguous if there are multiple Samsung devices in the living room) may be modified to match the command script that was previously determined to be unambiguous ("select_channel 5 type tv and type samsung and place living room"). In such an example, missing parameters that render a command script ambiguous may be populated with parameters from previous command scripts sharing other similarities.

At step 412, one or more command signals may be generated based on the command script. In some non-limiting embodiments, this step may not be performed and the command script may be communicated directly to a target device that is configured to interpret and execute a command script without ambiguities. In some non-limiting embodiments, rather than communicate a command script to the specific target device, the control device may broadcast the command script to each device in the plurality of devices or to a subset of devices in the plurality of devices, such that each device is configured to receive, interpret, and process the commands directly from the command script.

In some non-limiting embodiments, the command script may be used to generate one or more command signals native to the target device. At step 412 the command script may be converted into one or more command signals for the target device. For example, if the target device is controlled via an infrared (IR) remote control, the command script may be used to generate an IR code sequence. As another example, if the target device is controlled via a wireless network (e.g., WiFi®) communication, the command script may be used to generate a network addressed command to the target device and/or to generate an API request (e.g., such as a RESTful API request for that device). As yet a further example, if the target device is controlled via direct radio communication (e.g., Bluetooth®) or indirect radio communication (e.g., through a communication hub), the command script may be used to generate one or more packets and/or data streams for radio communication based on the appropriate protocol (e.g., Bluetooth® or the like).

In some non-limiting embodiments, the control device and/or another device may generate the command signals based on the command script and/or communicate the command signals to the target device. For example, the control device and/or a communication hub (e.g., a set top box, an Internet of Things (IoT) home appliance controller, or the like) may include a command signal generator to generate the command signals and/or communicate the command signals to the target device. The command signals may be communicated via an appropriate communication channel (e.g., network packet, Bluetooth®, IR, etc.). In some examples, the control device or other communication hub may receive a response message from the target device, such as an acknowledgement, from devices having two-way communication capabilities.

In non-limiting embodiments, once one or more command signals are communicated to the target device(s), a validation may be provided to the user. For example, a speech synthesis engine may be used to audibly confirm the successful command (e.g., "playing the lion king" or "playing the lion king in the kitchen") via an acoustic channel.

After one or more command signals are communicated to control a device, the method may proceed to step 413 in which a context database is updated. A context database may include one or more data structures including user commands and associated contextual parameters relating to each of the user actions. For example, the context database may specify the type of command (e.g., play music, watch television, switch channel, turn off lights, and/or the like) in association with the time and/or date of such command, a temporal reference to such command (e.g., weekday, weekend, evening, morning, mid-day, and/or the like), the weather when the command was issued, the indoor room temperature when the command was issued, the number of people in the room when the command was issued, the location of the user when the command was issued, and/or the like. It will be appreciated that any data available to the control device and/or a device in communication with the control device may be used to update the context database.

In non-limiting embodiments, a command script may include multiple commands for controlling multiple devices. For example, the natural language text string "turn the red lights on and play music in my living room" includes separate commands for two devices. In some examples, the command script may be generated with two or more commands separated by a delimiter (e.g., a comma, semicolon, etc.), such as "power on type light and color red; select music play place living room".

Figure 6:
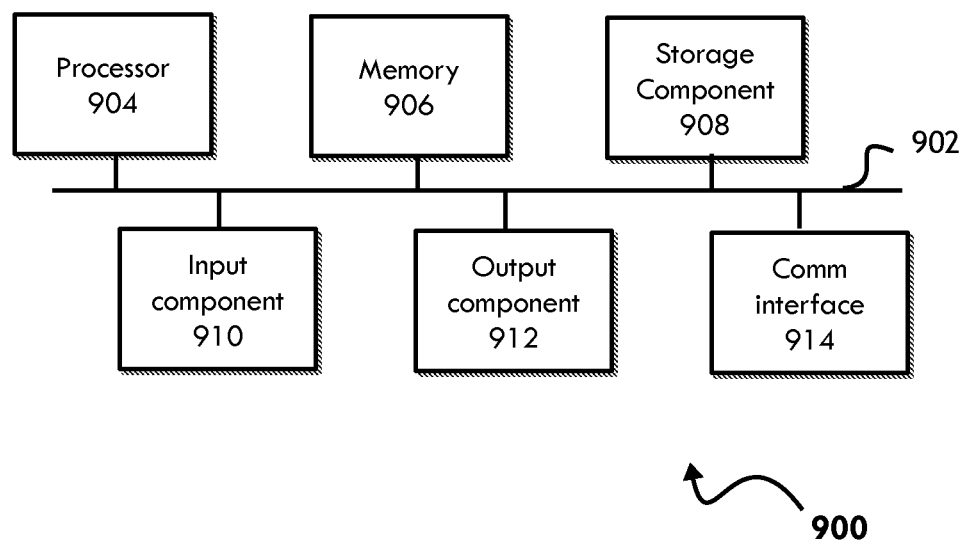
FIG. 6 illustrates example components of a computing device used in connection with non-limiting embodiments.

Referring now to FIG. 6, shown is a diagram of example components of a computing device 900 for implementing and performing the systems and methods described herein according to non-limiting embodiments. The computing device 900 may correspond to, for example, the control device 102 and/or devices 112*a-d* shown in FIG. 1. In some non-limiting embodiments, device 900 may include additional components, fewer components, different components, or differently arranged components than those shown in FIG. 6. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 6, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for controlling a plurality of devices with speech commands, comprising:

implementing a machine-learning model with at least one processor so that the machine-learning model processes a text string to generate a raw command script, the text string comprising a natural language input by a user and the command script comprising a machine-interpretable sequence of tokens or machine-interpretable alphanumeric characters and comprising a configuration for at least one device that has a placeholder, the placeholder corresponding to an unknown or uncertain parameter value of the command script, wherein the machine learning model comprises an encoder, a context engine and at least one of a decoder and a script generator, and wherein generating the command script comprises:
receive the text string at the encoder;
generate a feature vector with the encoder based on the text string;
receive the feature vector at the at least one of the decoder and the script generator;
generate the raw command script with the at least one of the decoder and the script generator based on the feature vector;
modifying, with the at least one processor, the raw command script with the context engine based on contextual data to generate a refined command script, the refined command script comprising the configuration for at least one device such as the machine-interpretable sequence of tokens or the machine-interpretable alphanumeric characters, wherein the configuration of the refined command script has been modified so that the placeholder is replaced with a parameter value determined based on the contextual data;
generating, with the at least one processor, at least one command signal based on the command script; and
controlling the at least one device based on the at least one command signal.

2. The method of claim 1, wherein the configuration comprises at least one of the following: a setting, media content, or any combination thereof.

3. The method of claim 1, wherein modifying the command script comprises:
determining, with the at least one processor, the configuration based on the contextual data.

4. The method of claim 1, further comprising:
receiving a speech input from the user; and
translating, with the at least one processor, the speech input to the text string.

5. The method of claim 1, wherein the placeholder comprises a location name, and wherein the placeholder of the raw command script is replaced with a predefined location from the configuration data.

6. The method of claim 1, wherein the configuration data comprises at least one data structure associating device identifiers with locations.

7. The method of claim 1, further comprising normalizing, with the at least one processor, the text string.

8. The method of claim 1, further comprising:
retrieving external data from a remote database based on at least a portion of the text string, wherein generating the raw command script is based further on the external data.

9. The method of claim 1, wherein generating the raw command script comprises selecting the at least one device from the plurality of devices.

10. The method of claim 9, wherein selecting the at least one device is based on at least one of the following: a location of the at least one device, a characteristic of the at least one device, a state of the at least one device, or any combination thereof.

11. The method of claim 10, wherein selecting the at least one device is based on the characteristic of the at least one device, and wherein the characteristic comprises at least one of the following: a size, a shape, a color, a brand, a technical feature, or any combination thereof.

12. The method of claim 10, wherein selecting the at least one device is based on the state of the at least one device, and wherein the state comprises at least one of the following: an activated state, a deactivated state, a value of a setting, or any combination thereof.

13. The method of claim 1, wherein the placeholder comprises at least one action associated with at least one condition.

14. The method of claim 1, wherein the contextual data comprises historical usage data of the at least one device.

15. The method of claim 1, wherein the contextual data comprises at least one pattern of use.

16. The method of claim 1, wherein the contextual data comprises at least one of a date and time.

17. The method of claim 1, further comprising:
determining, with the at least one processor, an ambiguity in the text string and/or the command script;
prompting, with the at least one processor, the user for a second speech input based on the ambiguity; and
modifying, with the at least one processor, the text string and/or the command script based on the second speech input.

18. A system for controlling a plurality of devices with speech commands, comprising at least one processor programmed or configured to:
implement a machine-learning model with the at least one processor so that the machine-learning model processes a text string to generate a command script, the text string comprising a natural language input by a user and the command script comprising a machine-interpretable sequence of tokens or machine-interpretable alphanumeric characters and comprising a configuration for at least one device that has a placeholder, the placeholder corresponding to an unknown or uncertain parameter value of the command script, wherein the machine learning model comprises an encoder, a context engine and at least one of a decoder and a script generator, and wherein generating the command script comprises:
receive the text string at the encoder;
generate a feature vector with the encoder based on the text string;
receive the feature vector at the at least one of the decoder and the script generator;
generate the raw command script with the at least one of the decoder and the script generator based on the feature vector;
modify the command script with the context engine based on contextual data to generate a refined command script, the refined command script comprising the configuration for at least one device such as the machine-interpretable sequence of tokens or the machine-interpretable alphanumeric characters, wherein the configuration of the refined command script has been modified so that the placeholder is replaced with a parameter value determined based on the contextual data;
generate at least one command signal based on the command script; and
control the at least one device based on the at least one command signal.

19. The system of claim 18, wherein the configuration comprises at least one of the following: a setting, media content, or any combination thereof.

20. The system of claim 18, wherein the at least one processor is programmed or configured to modify the command script by:
determining, with the at least one processor, the configuration based on the contextual data.

21. The system of claim 18, wherein the at least one processor is further programmed or configured to:
   receive a speech input from the user; and
   translate, with the at least one processor, the speech input to the text string.

22. The system of claim 18, wherein the placeholder comprises a location name, and wherein the placeholder of the raw command script is replaced with a predefined location from the configuration data.

23. The system of claim 18, wherein the configuration data comprises at least one data structure associating device identifiers with locations.

24. The system of claim 18, wherein the at least one processor is further programmed or configured to normalize, with the at least one processor, the text string.

25. The system of claim 18, wherein the at least one processor is further programmed or configured to retrieve external data from a remote database based on at least a portion of the text string, wherein generating the raw command script is based further on the external data.

26. The system of claim 18, wherein the at least one processor is programmed or configured to generate the raw command script by selecting the at least one device from the plurality of devices.

27. The system of claim 26, wherein the at least one processor is programmed or configured to select the at least one device based on at least one of the following: a location of the at least one device, a characteristic of the at least one device, a state of the at least one device, or any combination thereof.

28. The system of claim 27, wherein the at least one processor is programmed or configured to select the at least one device based on the characteristic of the at least one device, and wherein the characteristic comprises at least one of the following: a size, a shape, a color, a brand, a technical feature, or any combination thereof.

29. The system of claim 27, wherein the at least one processor is programmed or configured to select the at least one device based on the state of the at least one device, and wherein the state comprises at least one of the following: an activated state, a deactivated state, a value of a setting, or any combination thereof.

30. The system of claim 18, wherein the placeholder comprises at least one action associated with at least one condition.

31. The system of claim 18, wherein the contextual data comprises historical usage data of the at least one device.

32. The system of claim 18, wherein the contextual data comprises at least one pattern of use.

33. The system of claim 18, wherein the contextual data comprises at least one of a date and time.

34. The system of claim 18, wherein the at least one processor is further programmed or configured to:
   determine, with the at least one processor, an ambiguity in the text string and/or the command script;
   prompt, with the at least one processor, the user for a second speech input based on the ambiguity; and
   modify, with the at least one processor, the text string and/or the command script based on the second speech input.

35. A computer program product for controlling a plurality of devices with speech commands, comprising at least one non-transitory computer-readable medium including program instructions that, when executed by at least one processor, cause the at least one processor to:
   implement a machine-learning model with at least one processor so that the machine-learning model processes a text string to generate a raw command script, the text string comprising a natural language input by a user and the command script comprising a machine-interpretable sequence of tokens or machine-interpretable alphanumeric characters and comprising a configuration for at least one device that has a placeholder, the placeholder corresponding to an unknown or uncertain parameter value of the command script, wherein the machine learning model comprises an encoder, a context engine and at least one of a decoder and a script generator, and wherein generating the command script comprises:
   receive the text string at the encoder;
   generate a feature vector with the encoder based on the text string;
   receive the feature vector at the at least one of the decoder and the script generator;
   generate the raw command script with the at least one of the decoder and the script generator based on the feature vector;
   modifying, with the at least one processor, the raw command script with the context engine based on contextual data to generate a refined command script, the refined command script comprising the configuration for at least one device such as the machine-interpretable sequence of tokens or the machine-interpretable alphanumeric characters, wherein the configuration of the refined command script has been modified so that the placeholder is replaced with a parameter value determined based on the contextual data;
   generating, with the at least one processor, at least one command signal based on the command script; and
   controlling the at least one device based on the at least one command signal.

* * * * *